(12) United States Patent
Dunn et al.

(10) Patent No.: US 11,281,047 B1
(45) Date of Patent: Mar. 22, 2022

(54) BACKLIGHT GENERATION WITH LOCAL DIMMING FOR LIQUID CRYSTAL PANEL HAVING ARBITRARY SHAPE

(71) Applicant: Solomon Systech (China) Limited, Shenzhen (CN)

(72) Inventors: Pak Kong Dunn, Hong Kong (CN); Wing Chi Stephen Chan, Hong Kong (CN); Siu Hong Lui, Hong Kong (CN)

(73) Assignee: Solomon Systech (China) Limited, Nanjing (CN)

( * ) Notice: Subject to any disclaimer, the term of this patent is extended or adjusted under 35 U.S.C. 154(b) by 0 days.

(21) Appl. No.: 17/247,126

(22) Filed: Dec. 1, 2020

(51) Int. Cl.
| | | |
|---|---|---|
| *G02F 1/13357* | (2006.01) | |
| *G09G 3/34* | (2006.01) | |
| *B60K 35/00* | (2006.01) | |
| *G02F 1/1335* | (2006.01) | |

(52) U.S. Cl.
CPC ........ *G02F 1/133603* (2013.01); *B60K 35/00* (2013.01); *B60K 2370/343* (2019.05); *G02F 1/133601* (2021.01)

(58) Field of Classification Search
CPC ......... G02F 1/133603; G02F 1/133601; B60K 35/00; B60K 2370/343
See application file for complete search history.

(56) References Cited

U.S. PATENT DOCUMENTS

| | | | |
|---|---|---|---|
| 10,770,008 B2 * | 9/2020 | Sako | G09G 3/3426 |
| 2017/0365225 A1 * | 12/2017 | Yoneyama | G02F 1/133605 |
| 2021/0132439 A1 * | 5/2021 | Hong | G09G 3/006 |
| 2021/0208330 A1 * | 7/2021 | Sun | G02B 6/0051 |
| 2021/0294161 A1 * | 9/2021 | Mifune | G02B 19/0019 |
| 2021/0364855 A1 * | 11/2021 | Gu | G02F 1/133605 |
| 2021/0364858 A1 * | 11/2021 | Fu | G02F 1/133606 |

* cited by examiner

Primary Examiner — Tracie Y Green
(74) *Attorney, Agent, or Firm* — S&F/WEHRW

(57) ABSTRACT

In a liquid crystal display (LCD), a liquid crystal (LC) panel has a display area of arbitrary shape. A light-emitting area of a backlight panel is partitioned into zones for providing local dimming to the LC panel. The LC panel is partitioned into display regions. An apparatus for controlling the LC panel and the backlight panel has zone registers each recording a proportion of area of a zone covered by a corresponding display region. The apparatus computes a dimming factor for the zone according to its recorded proportion and pixel data of a portion of image located on the zone, allowing local dimming to be provided without requiring boundary information of the display area. A two-phase arrangement is used to calculate the dimming factor, achieving local dimming to save power in backlight generation while reducing a potential loss of image brightness in high-brightness part of the image portion.

19 Claims, 14 Drawing Sheets

BACKLIGHT GENERATION WITH LOCAL DIMMING FOR LIQUID CRYSTAL PANEL HAVING ARBITRARY SHAPE

LIST OF ABBREVIATIONS

IC Integrated circuit
LC Liquid crystal
LCD Liquid crystal display
LED Light emitting diode
mLED Mini light emitting diode

FIELD OF THE INVENTION

The present disclosure generally relates to displaying an image on a LC panel illuminated by backlight with local dimming. In particular, the present disclosure relates to controlling a backlight panel to generate backlight with local dimming for illuminating a LC panel having a display area that is arbitrary in shape, and relates to displaying a rectangular raw image using the LC panel and the backlight panel.

BACKGROUND

In a traditional LCD, light leakage in LC cells limits a maximum contrast ratio and an achievable level of darkness on a display area of the LCD. A good-quality LCD can achieve an intrinsic contrast ratio of ~5000:1. For a normal-quality one, an intrinsic contrast ratio of ~2000:1 can be achieved.

Local dimming is a technique that advantageously enables a LCD to enhance its maximum contrast ratio in image generation and to save power. In the LCD, a LC panel is illuminated by backlight generated by a backlight panel. Local dimming is achieved by partitioning the backlight panel into a plurality of lighting zones and by adjusting a backlight luminance level of an individual zone according to pixel data of image portion to be displayed on a portion of the LC panel overlying the individual zone. Usually, the backlight luminance level is lower, or considerably lower, than the maximum luminance level deliverable by the backlight panel. Even in the presence of light leakage of the LC cells, a contrast ratio of ~100,000:1 is not difficult to generate.

Apart from enhancing the maximum contrast ratio, another major advantage of local dimming is that power can be saved, since the backlight panel is not always operated at the maximum luminance level over an entire light-emitting area of the backlight panel. This advantage is particularly valuable if the LCD is operated in a power-limited environment, such as when the LCD is used in a portable consumer-electronics device.

In the art, simple local-dimming algorithms of good performance have been designed under an assumption that the LC panel is rectangular. Recently, displays with non-rectangular display areas are gaining increasing popularity, especially in consumer-electronics products. Conventional local-dimming algorithms designed for rectangular display areas are not suitable and desirable for LCDs with non-rectangular display areas. Alternatively, a local-dimming algorithm specifically designed for a non-rectangular display can be optimized in performance only if boundary information of the LC panel is involved. The processing of the boundary information nevertheless increases the algorithm complexity.

There is a need in the art for a local-dimming technique usable for a LCD having a LC panel with a non-rectangular display area while boundary information of the display area is not required in determining dimming factors of different zones of a backlight panel in the LCD. Without involving the boundary information, the local-dimming technique can be implemented with reduced complexity. The technique may be implemented in, e.g., a driver of the LC panel or a controller of the backlight panel.

SUMMARY OF THE INVENTION

A first aspect of the present disclosure is to provide a method for controlling a LC panel and a backlight panel to display a rectangular raw image. The backlight panel is used for illuminating the LC panel. The LC panel has a display area arbitrary in shape. A light-emitting area of the backlight panel is partitioned into a plurality of zones individually controllable for providing local dimming to the LC panel. The plurality of zones defines a grid used for partitioning the display area into a plurality of display regions such that an individual display region is illuminated by a corresponding zone of the backlight panel.

In the method, a number of pixels on the individual display region is determined. The number of pixels is determinable according to a proportion of area of the corresponding zone covered by the individual display region. In addition, a plurality of pixel data of a portion of the image located on the corresponding zone is received. A plurality of pixel brightness levels of the image portion is computed according to the plurality of pixel data. Advantageously, a dimming factor used in generating backlight for the corresponding zone is determined according to the plurality of pixel brightness levels and the number of pixels on the individual display region in an absence of boundary information of the display area, thereby allowing local dimming to be provided without a need for such boundary information. The corresponding zone is controlled to generate backlight with the determined dimming factor. Additionally, a plurality of modified pixel data of the image portion is computed from the plurality of pixel data according to at least the dimming factor. The plurality of modified pixel data is sent to the LC panel for displaying the image portion on the individual display region.

Preferably, the determination of the dimming factor comprises the steps of: computing a first average value, $\bar{B}$, by $\bar{B} = N^{-1} \Sigma_{i=1,\ldots,N} B_i$, where N is the number of pixels on the individual display region, and $\{B_i | i=1, \ldots, N\}$ is the plurality of pixel brightness levels; computing a second average value, $\bar{B}^\dagger$, by $\bar{B}^\dagger = N^{-1} \Sigma_{i=1,\ldots,N} f(B_i)$, where $f(x)$ is a function satisfying that $f(x)=x$ for $x \leq \bar{B}$ and $f(x)>x$ for $x > \bar{B}$, thereby causing a first pixel brightness level greater than the first average value to receive a greater weight in computing the second average value than a second pixel brightness level that is less than the first average value where the first and second pixel brightness levels are in the plurality of pixel brightness levels, and hence causing the second average value to be inflated from the first average value; and determining the dimming factor to be a lower one of a candidate dimming factor and 100%, the candidate dimming factor being a ratio of the second average value to a predetermined maximum brightness level deliverable by the backlight panel, thereby achieving local dimming to save power in backlight generation while reducing a potential loss of image brightness in high-brightness part of the image portion.

It is also preferable that $f(x)$ is an increasing function and is increasingly divergent as x increases from $\bar{B}$, thereby providing an increasingly greater weight to a third pixel brightness level in computing the second average value as the third pixel brightness level increases from the first average value where the third pixel brightness level is in the plurality of pixel brightness levels.

In certain embodiments, before controlling the corresponding zone to generate backlight, the dimming factor is updated by a first updating process. The first updating process comprises the steps of: obtaining respective dimming factors determined for neighboring zones immediately adjacent to the corresponding zone, said respective dimming factors forming a plurality of neighboring-zone dimming factors; and if the dimming factor is not less than a threshold value equal to a predetermined percentage of a maximum value in the plurality of neighboring-zone dimming factors, then keeping the dimming factor unchanged, else updating the dimming factor to be the threshold value so as to reduce luminance non-uniformity occurred over the corresponding zone and caused by light leakage to and from the neighboring zones. The predetermined percentage may be in a range of 60% to 70%.

In certain embodiments, before controlling the corresponding zone to generate backlight, the dimming factor is updated by a second updating process. The second updating process comprises the steps of: obtaining respective dimming factors determined for neighboring zones immediately adjacent to the corresponding zone, the dimming factor and said respective dimming factors collectively forming a plurality of dimming factors obtained by a cluster consisting of the corresponding zone and the neighboring zones; and filtering the plurality of dimming factors obtained by the cluster with a nonlinear spatial filter to update the dimming factor, wherein the nonlinear spatial filter is configured to reduce luminance non-uniformity occurred over the corresponding zone and caused by light leakage to and from the neighboring zones.

In certain embodiments, the plurality of modified pixel data is computed from the plurality of pixel data according to the determined dimming factor and a gamma value of the LC panel.

In the plurality of pixel data, an individual pixel data associated with a corresponding pixel of the image portion may consist of a plurality of subpixel data. Each subpixel data indicates a pixel brightness level of a color component in forming the image portion at the corresponding pixel.

In computing the plurality of pixel brightness levels of the image portion, a pixel brightness level of the image portion displayed at the corresponding pixel may be computed as a maximum value in the plurality of subpixel data.

A second aspect of the present disclosure is to provide an apparatus for controlling a LC panel and a backlight panel to display a rectangular raw image. The backlight panel is used for illuminating the LC panel. The LC panel has a display area arbitrary in shape. A light-emitting area of the backlight panel is partitioned into a plurality of zones individually controllable for providing local dimming to the LC panel. The plurality of zones defines a grid used for partitioning the display area into a plurality of display regions such that an individual display region is illuminated by a corresponding zone of the backlight panel.

The apparatus comprises a plurality of zone registers for the plurality of zones. A respective zone register for the corresponding zone is used to record a proportion of area of the corresponding zone covered by the individual display region. The apparatus further comprises one or more computing units communicable with the plurality of zone registers. The one or more computing units are configured to control the corresponding zone to generate backlight with a dimming factor determined according to plural pixel data of a portion of the image located on the corresponding zone and according to the proportion of area of the corresponding zone covered by the individual display region, allowing local dimming to be provided without a need for boundary information of the display area.

Preferably, the one or more computing units are further configured to execute a process according to any of the embodiments of the method disclosed above.

A third aspect of the present disclosure is to provide a LCD.

The LCD comprises a LC panel and a backlight panel. The backlight panel is used for illuminating the LC panel. The LC panel has a display area arbitrary in shape. A light-emitting area of the backlight panel is partitioned into a plurality of zones individually controllable for providing local dimming to the LC panel. The plurality of zones defines a grid used for partitioning the display area into a plurality of display regions such that an individual display region is illuminated by a corresponding zone of the backlight panel. Advantageously, the LCD further comprises any of the embodiments of the apparatus disclosed above for controlling the LC panel and the backlight panel to display a rectangular raw image.

In certain embodiments, the corresponding zone is formed with a plurality of mLEDs distributed over the corresponding zone. The plurality of mLEDs is controllable by the apparatus to collectively generate backlight with the dimming factor.

Other aspects of the present invention are disclosed as illustrated by the embodiments hereinafter.

Skilled artisans will appreciate that elements in the figures are illustrated for simplicity and clarity and have not necessarily been depicted to scale.

DETAILED DESCRIPTION

As used herein, that a display area of a LCD is "arbitrary" in shape means that the display area can be rectangular or non-rectangular in shape. A rectangular display area is a conventional choice for realizing a LCD, and is self-explanatory. A non-rectangular display area may have a circular shape, an elliptical shape, a triangular shape, a trapezoidal shape, a hexagonal shape, a shape looking like an animal such as a fish, or any irregular shape not considered a rectangle and a square.

Since a square is a rectangle in which two adjacent sides have equal length, a square is a special case of a rectangle. As used herein, that an image is "rectangular" means that the image has a rectangular shape. The rectangular shape may be a shape of a square.

As used herein, "brightness level" of a light source and "luminance level" of the light source are used interchangeably. Both "brightness level" and "luminance level" mean a luminous intensity of light generated by the light source. The light source may be a backlight panel, a LED, a mLED, a pixel on a screen of a display, etc.

As used herein, "a dimming factor" is a ratio of a luminance level of light generated by a light source to a maximum luminance level deliverable by the light source. In short, the dimming factor is a percentage of full luminance. The dimming factor is non-negative and is upper-bounded by 100%.

As used herein, "boundary information" of a display area means a geometric characterization of a boundary of the display area. The geometric characterization may be given by, e.g., a set of x-y coordinates locating selected points of the boundary with reference to a certain reference point.

Figure 1:
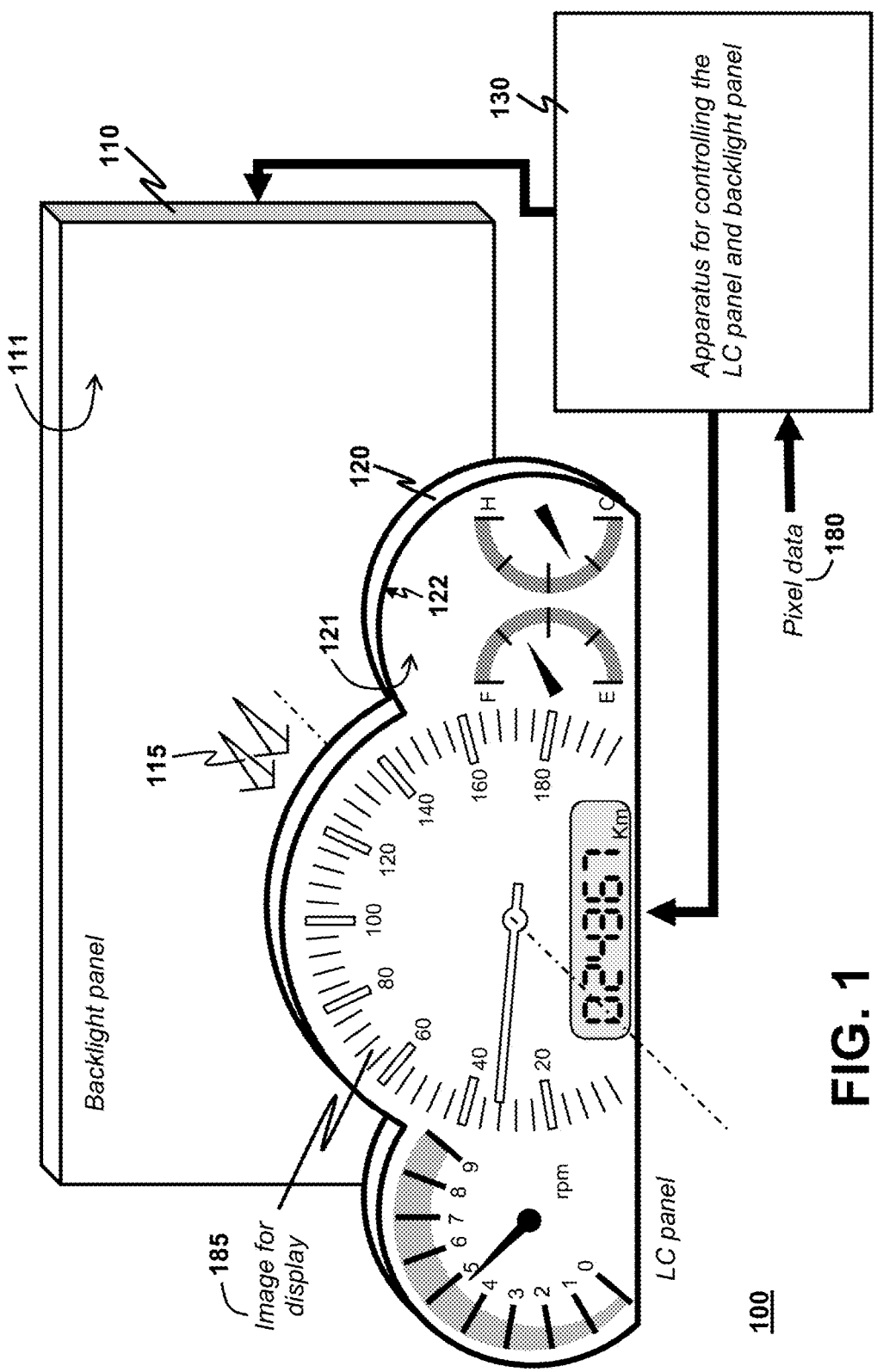
FIG. 1 depicts a LCD for displaying a rectangular raw image as considered in the present disclosure, where the LCD uses a backlight panel to illuminate a LC panel in displaying the image, and where the LC panel has a display area arbitrary in shape.

FIG. 1 depicts a disclosed LCD 100 as considered in the present disclosure. The LCD 100 comprises a LC panel 120 and a backlight panel 110. The backlight panel 110 is used for generating backlight beams 115 to illuminate the LC panel 120. The backlight panel 110 has a light-emitting area 111 for emitting the backlight beams 115. The backlight beams 115 are received at a backside of the LC panel 120. LC cells in the LC panel 120 are used to modulate transmittance of the backlight beams 115 that pass through the LC panel 120, thereby forming a visible image 185 on the LC panel 120. As considered in the present disclosure, the LC panel 120 has a display area 121 that is arbitrary in shape. The visible image 185 has a shape following that of the display area 121. Since the backlight beams 115 are required to illuminate the entire display area 121 from the backside of the LC panel 120, the light-emitting area 111 of the backlight panel 110 is large enough to cover the entire display area 121. Local dimming is provided by the backlight panel 110. The light-emitting area 111 is partitioned into plural lighting zones. The lighting zones are individually controllable in backlight luminance level for providing local dimming to the LC panel 120. The LCD 100 further comprises an apparatus 130 for controlling the LC panel 120 and the backlight panel 110. Local dimming is achievable by appropriately configuring or programming the apparatus 130 to control different lighting zones of the backlight panel 110. The apparatus 130 receives pixel data 180 of a rectangular raw image. (Due to practical constraints in data storage and image format, the raw image is rectangular even though the display area 121 shown in FIG. 1 is non-rectangular.) The apparatus 130 coordinates operations of the backlight panel 110 and the LC panel 120 in displaying the visible image 185 while achieving local dimming.

Although FIG. 1 depicts that the light-emitting area 111 is rectangular in shape as an example for illustration, it is possible that the light-emitting area 111 has a non-rectangular shape. Furthermore, it is sometimes advantageous to have the shape of the light-emitting area 111 close to the shape of the display area 121 such that a minimum number of light sources can be installed in the backlight panel 110 for cost saving while enabling the light-emitting area 111 to cover the entire display area 121. In the present disclosure, the light-emitting area 111 of the backlight panel 110 may have an arbitrary shape.

Figure 2:
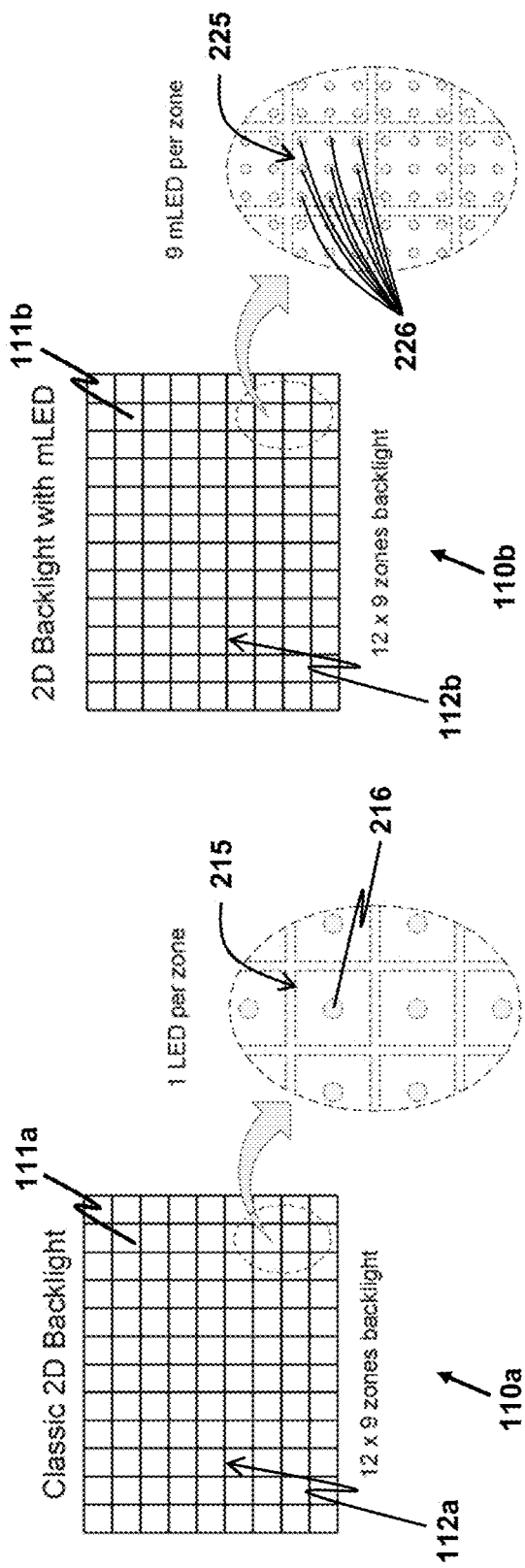
FIG. 2 depicts two configurations of the backlight panel typically used for providing local dimming, showing that in practice, the backlight panel is often partitioned into a small number of lighting zones in comparison to the number of pixels installed on the LC panel.

FIG. 2 depicts two configurations of the backlight panel 110 typically used for providing local dimming. In a first backlight panel 110a and a second backlight panel 110b, respective light-emitting areas 111a, 111b are each divided into 12×9 zones. The 12×9 zones in the first backlight panel 110a define a first grid 112a for locating boundaries of the zones. Similarly, a second grid 112b is defined by the 12×9 zones of the second backlight panel 110b. In the first backlight panel 110a, one LED is used as a single light source for backlight generation in one zone. For instance, a certain zone 215 is mounted with only one LED 216 for illuminating an area of the LC panel 120 overlying the zone 215. Apart from LEDs, mLEDs can also be used. A mLED is smaller than a conventional LED in size. In the second backlight panel 110b, plural mLEDs 226, due to their small size, can be accommodated in a zone 225. All the mLEDs 226 on the zone 225 are used to illuminate a certain area of the LC panel 120 overlying the zone 225. Note that each of the first and second backlight panels 110a, 110b has only 12×9 zones. In practical situations, the backlight panel 110 is often partitioned into a small number of zones in comparison to the number of pixels on the LC panel 120.

Since the light-emitting area 111 and the display area 121 are of different size, and since the display area 121 has an arbitrary shape, a knowledge of a boundary 122 of the display area 121 is useful in realizing local dimming. A simple method to record boundary information of the display area 121 is to divide the light-emitting area 111 into small squares. Each small square has a size of a small number of pixels on the LC panel 120, e.g., 4×4 pixels. If over one half of the area of an individual square overlies the display area 121, a "1" is recorded. Therefore, one square only requires 1 bit of memory for recording whether the square is inside or outside the display area 121. Although this recording method is intuitive and simple, it is not a preferred way for local-dimming calculation since an additional table is required to indicate which square belongs to which lighting zone of the backlight panel 110. It increases requirements in memory and computation in local-dimming calculation. It is desirable to perform local-dimming calculation without a need for boundary information of the display area 121, thereby allowing the requirements in memory and computation to be reduced.

In the present disclosure, advantageously, a first aspect thereof is to provide the apparatus 130 for controlling the LC panel 120 and the backlight panel 110 to display a rectangular raw image. A second aspect of the present disclosure is to provide a method for controlling the LC panel 120 and the backlight panel 110 to display the rectangular raw image. Preferably, the apparatus 130 is configured to use the disclosed method. In both the apparatus 130 and the disclosed method, local dimming is provided without a need for boundary information of the display area 121 of the LC panel 120. A third aspect of the present disclosure is to provide the LCD 100 utilizing the apparatus 130 or the disclosed method in displaying the image.

Figure 3:
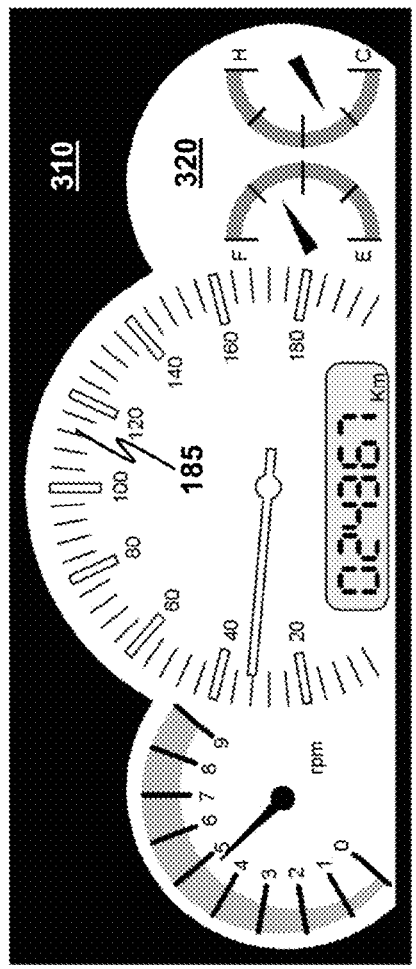
FIG. 3 depicts the rectangular raw image carried by pixel data for display at the LC panel, showing a displayable-content area for display on the LC panel, and a non-displayable area not useful for display.

FIG. 3 depicts a rectangular raw image 300 carried by the pixel data 180 for reception by the apparatus 130. The rectangular raw image 300 is divided into a displayable-content area 320 having the visible image 185 for display on the LC panel 120, and a non-displayable area 310 not useful for display. Practically and usually, image data for the non-displayable area 310 are set to zero such that the non-displayable area 310 visually appears to be completely dark. Herein in the development of the disclosed apparatus and method, it is assumed that the pixel data 180 received by the apparatus 130 are image data of a rectangular image and that pixel data of a non-displayable area are set to zero.

The Inventors have found that a knowledge of a proportion of area of each zone overlapping with the display area 121 is useful to enable local-dimming calculation without a need for boundary information of the display area 121. The determination of the aforementioned proportion is elaborated with the aid of FIG. 4, which depicts the display area 121 overlying the light-emitting area 111 for reflecting the arrangement of the LCD 100 that the LC panel 120 overlies the backlight panel 110. The light-emitting area 111 is divided into an array of 11×5 zones. Four zones 411-414 in the array are used for illustration. The array of 11×5 zones define a grid 112, which locates boundaries of the 11×5 zones. The grid 112 is used to partition the display area 121 into a plurality of display regions such that an individual display region is illuminated by a corresponding zone of the backlight panel 110. For illustration, three display regions 421-423 in the plurality of display regions are shown. The display regions 421, 422, 423 overlie, and are illuminated by, their corresponding zones 411, 412, 413, respectively. Note that the display region 421 fully covers its corresponding zone 411. The proportion of area of the zone 411 overlying the display area 121 is the proportion of area of the corresponding zone 411 covered by the display region 421, and is equal to 100%. The two display regions 422, 423 partially overlap their corresponding zones 412, 413, respectively. It follows that the proportion of area of the corresponding zone 412 (413) covered by the display region 422 (423) is less than 100%. Since the zone 414 does not cover the display area 121, the proportion of area of the zone 414 covered by its corresponding display region is 0%. The calculation of other display regions on the display area 121 is similar.

Figures 4, 5:
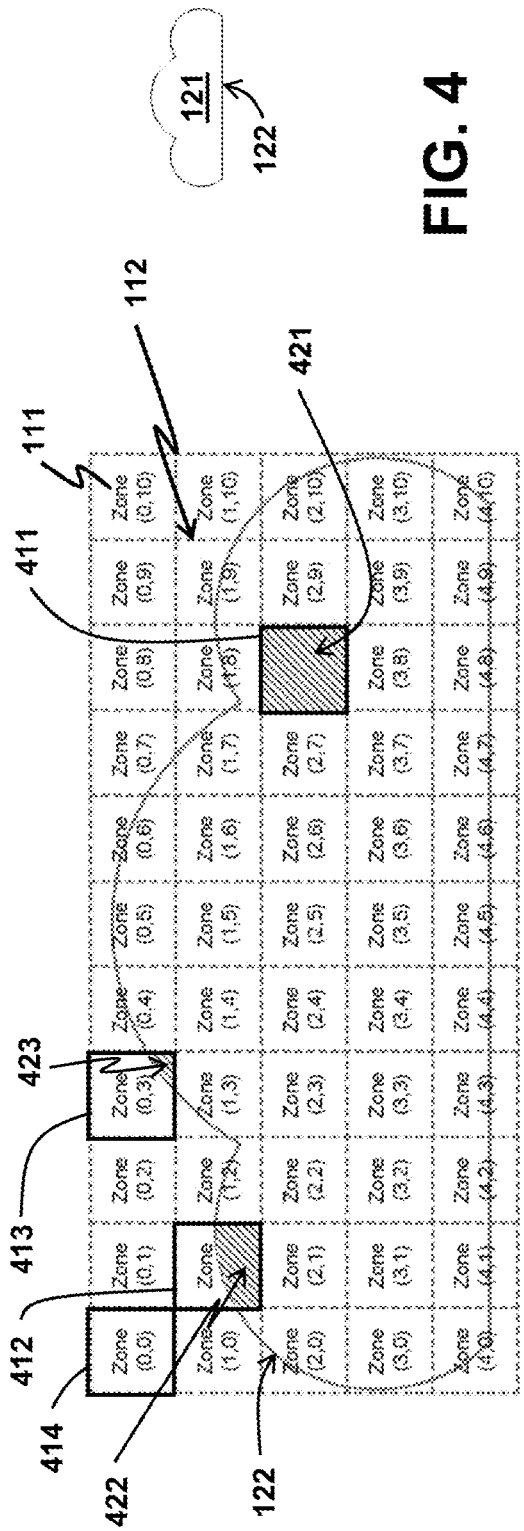
FIG. 4 depicts the display area overlying the light-emitting area for illustrating estimation of a proportion of a lighting zone in area overlying the display area.
FIG. 5 depicts a plurality of zone registers for storing estimated proportion values for the display area and light-emitting area shown in FIG. 4.

FIG. 5 depicts a plurality of zone registers 132 implementable in the apparatus 130 for storing the estimated proportion values. Zone registers 511-513 are used for illustration. The zone register 511 stores a value of the proportion of area of the zone 411 covered by the display region 421. Similarly, the zone register 512 stores a value of the proportion of area of the zone 412 covered by the display region 422, and the zone register 513 stores a value of the proportion of area of the zone 413 covered by the display region 423. Since computer memory modules are often used to realize the plurality of zone registers 132 in the apparatus 130, each zone register is a digital word, e.g., a 16-bit word. As an example shown in FIG. 5, the zone registers 511, 512, 513 stores numeric values of 5184, 2304 and 358, respectively.

Figure 6:
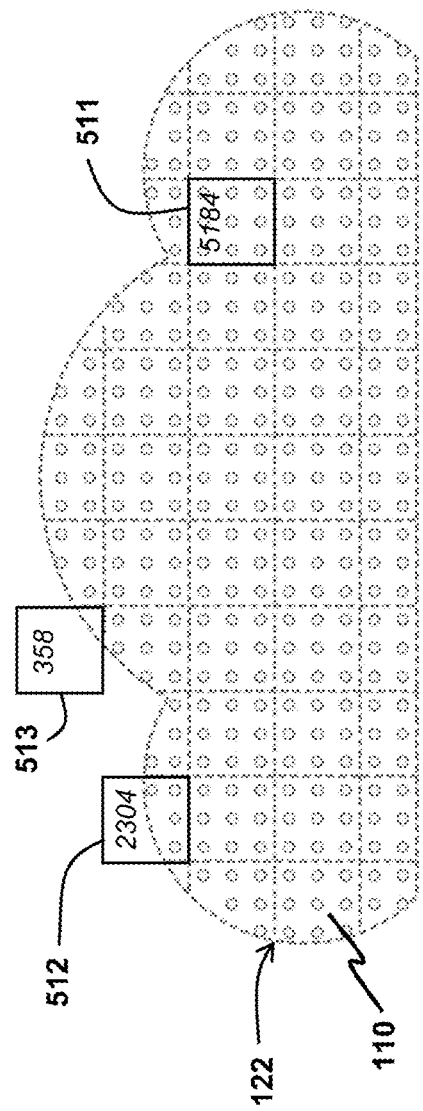
FIG. 6 depicts a configuration of the backlight panel installed with mLEDs, where the display area's boundary is also drawn for demonstrating that the count of mLEDs may not be equivalent to the estimated proportion value for a lighting zone near the boundary.

Since storing integer values instead of real numbers in the plurality of zone registers 132 has practical advantages, the proportion of area of corresponding zone covered by a display region can be equivalently represented by equivalent variables. Note that different zones in the plurality of zone registers 132 are most often realized to be of equal size in practice. Under this condition, one equivalent variable is the number of pixels on an individual display region. Also under this condition, if mLEDs are used in the backlight panel 110, another equivalent variable is the number of mLEDs on the corresponding zone overlapping with the individual display region. However, care should be taken if the individual display region is small but non-vanishing with respect to the corresponding zone. It is possible that no mLED is present under the individual display region so that a zero count of mLED is obtained, but the proportion of area of corresponding zone covered by the individual display region should be non-zero. Adjustment in the count of mLEDs may be needed for a zone around the display-area boundary 122. FIG. 6 depicts a configuration of the backlight panel 110 installed with mLEDs, where the display-area boundary 122 is also drawn. The zone register 513 stores a value of 358 for reflecting the estimated proportion value calculated for a non-vanishing display region on its corresponding zone, but there is a zero count of mLED under this display region.

Figure 7:
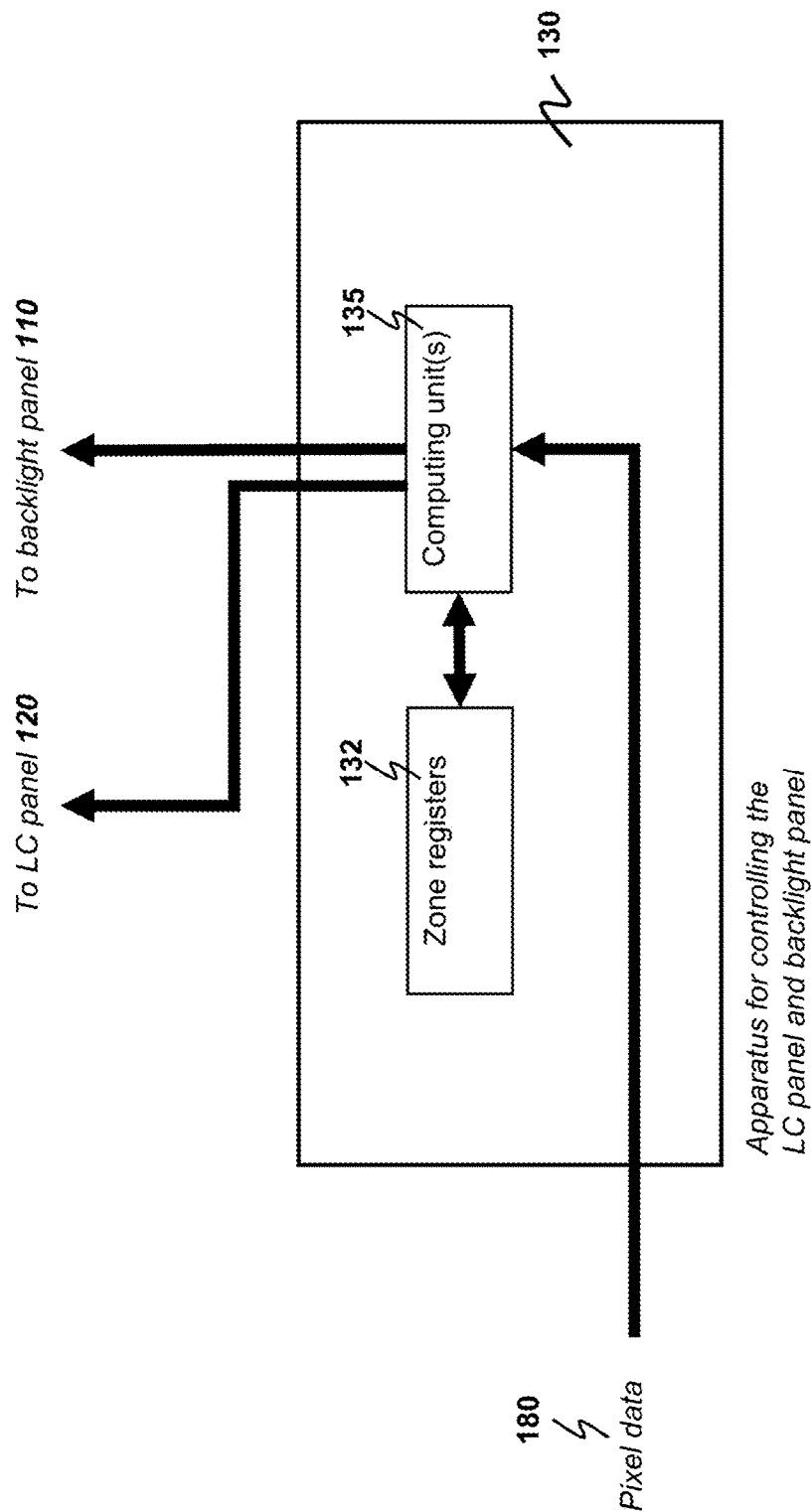
FIG. 7 depicts an exemplary configuration of an apparatus for controlling the LC panel and the backlight panel with an advantage of providing local dimming without a need for boundary information of the display area.

FIG. 7 depicts an exemplary configuration of the apparatus 130 for achieving an advantage of providing local dimming without a need for boundary information of the display area 121. The apparatus 130 comprises the plurality of zone registers 132 for the plurality of zones of the backlight panel 110. As mentioned above, a respective zone register for the corresponding zone is used to record a proportion of area of the corresponding zone covered by the individual display region. The apparatus 130 further comprises one or more computing units 135 communicable with the plurality of zone registers 132. The one or more computing units 135 are used to control the LC panel 120 and the backlight panel 110 for displaying the visible image 185. In particular, the one or more computing units 135 are further configured to control the corresponding zone to generate backlight with a dimming factor determined according to (a) a section of the pixel data 180 belonging to a portion of the rectangular raw image 300 located on the corresponding zone, and (b) the proportion of area of the corresponding zone covered by the individual display region. As a result, it allows local dimming to be provided without a need for boundary information of the display area.

In practical implementation, most often the apparatus 130 communicates with the LC panel 120 and the backlight panel 110 in digital words that are integers rather than real numbers. Although the dimming factor is a real number between 0 and 1 inclusively, those skilled in the art will appreciate that it is possible to transform the real number into an appropriate integer for communicating with the backlight panel 110. Consider an example that the apparatus 130 uses an 8-bit word as a data format in communicating with the backlight panel 110. A value of 255 may be used for indicating a dimming factor of 100%, commanding a particular zone to generate a maximum brightness level deliverable by the backlight panel 110. Similarly, a value between 0 and 254 indicates a dimming factor that is less than 100%.

Figure 8:
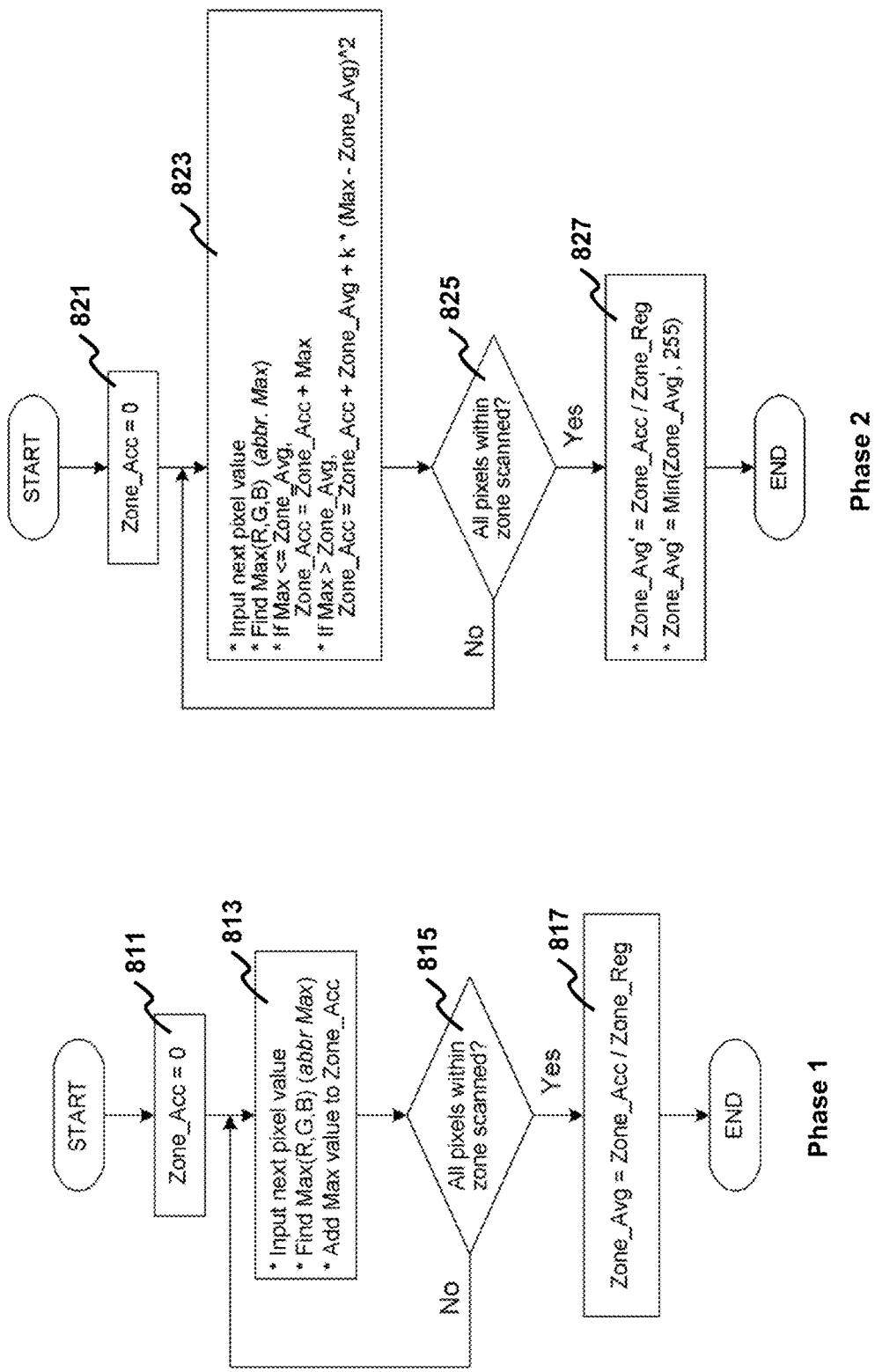
FIG. 8 depicts a two-phase arrangement for computing a dimming factor for an individual zone.

Advantageously, it is preferable that the one or more computing units 135 compute a dimming factor for an individual zone by a two-phase arrangement. Respective dimming factors for the plurality of zones are obtained by repeating execution of the two-phase arrangement for all the zones. FIG. 8 depicts a flowchart showing exemplary steps of the two-phase arrangement. The arrangement consists of a phase-1 computation for computing a first average value, and a phase-2 computation for obtaining a second average value inflated from the first average value. Without loss of generality, the display region 422 and the corresponding zone 412 are considered in illustrating the two-phase arrangement.

In the phase-1 computation, the inputs are a subset of the pixel data 180 for a part of the rectangular raw image 300 positioned on the zone 412. In an initialization step 811, an accumulator value, Zone_Acc, is initialized to zero. A loop is formed by steps 813 and 815. In the step 813, an individual pixel data is obtained. A pixel brightness level is obtained by finding a maximum value of three subpixel data, R, G and B, of the individual pixel data. (The pixel brightness level is a brightness level of light to be emitted from a pixel having the individual pixel data.) The obtained pixel brightness level is added to Zone_Acc. The loop is repeated until all pixel data in the pixel-data subset are processed. After the loop is executed, the first average value, Zone_Avg, is computed in a step 817 by Zone_Avg=Zone_Acc/Zone_Reg, where Zone_Reg is the value stored in the zone register 512. Particularly, Zone_Reg is chosen to store the total number of pixels on the display region 422.

Note that the pixel-data subset contains pixel data of image pixels positioned on the zone 412. As the zone 412 is located on the display-area boundary 122, the zone 412 is bigger than the display region 422. Since the pixel data for the non-displayable area 310 are set to zero, Zone_Acc actually gives a sum of pixel brightness levels for pixels over the display region 422. As mentioned above, it is possible that Zone_Reg is chosen to store the total number of pixels on the display region 422. By this choice of Zone_Reg, Zone_Avg is an average value of pixel brightness levels over the display region 422. Also notice that Zone_Avg is a plain average value without providing different weights to different pixel brightness levels.

In the phase-2 computation, apart from the subset of the pixel data 180 for the part of the rectangular raw image 300 positioned on the zone 412, an additional input is the first average value Zone_Avg. In an initialization step 821, Zone_Acc is initialized to zero. A loop is formed by steps 823 and 825. In the step 823, an individual pixel data is obtained. A pixel brightness level of the individual pixel data is obtained by finding a maximum value of three subpixel data, R, G and B, of the individual pixel data. Different from the phase-1 computation, the obtained pixel brightness level is not necessarily added to Zone_Acc. Instead, the pixel brightness level is added to Zone_Acc only if the pixel brightness level is less than or equal to Zone_Avg. If the pixel brightness level is greater than Zone_Avg, Zone_Acc is incremented by Zone_Avg+k×(Max−Zone_Avg)$^2$ where k is a certain predetermined multiplying factor, and Max denotes the obtained maximum value of the three subpixel data. If Max and Zone_Avg are limited to be integer values (as often used in practical implementation), it can be shown that Zone_Avg+k×(Max−Zone_Avg)$^2$ is greater than Max if k is greater than one. It follows that the pixel brightness level is inflated in calculating Zone_Acc, thereby giving a greater weight to the pixel brightness level in this calculation. The loop formed by the steps 823 and 825 is repeated until all pixel data in the pixel-data subset are processed. After the loop is executed, the second average value, Zone_Avg', is computed in a step 827 by Zone_Avg'=Zone_Acc/Zone_Reg under a constraint that Zone_Avg' is upper-bounded by 255. The value 255 corresponding to the maximum brightness level deliverable by the backlight panel 110. The value of Zone_Avg' can be used to set the dimming factor of the zone 412, or can be used to directly control the backlight panel 110 in dimming the zone 412. Note that Zone_Avg' is inflated from Zone_Avg.

Figure 9:
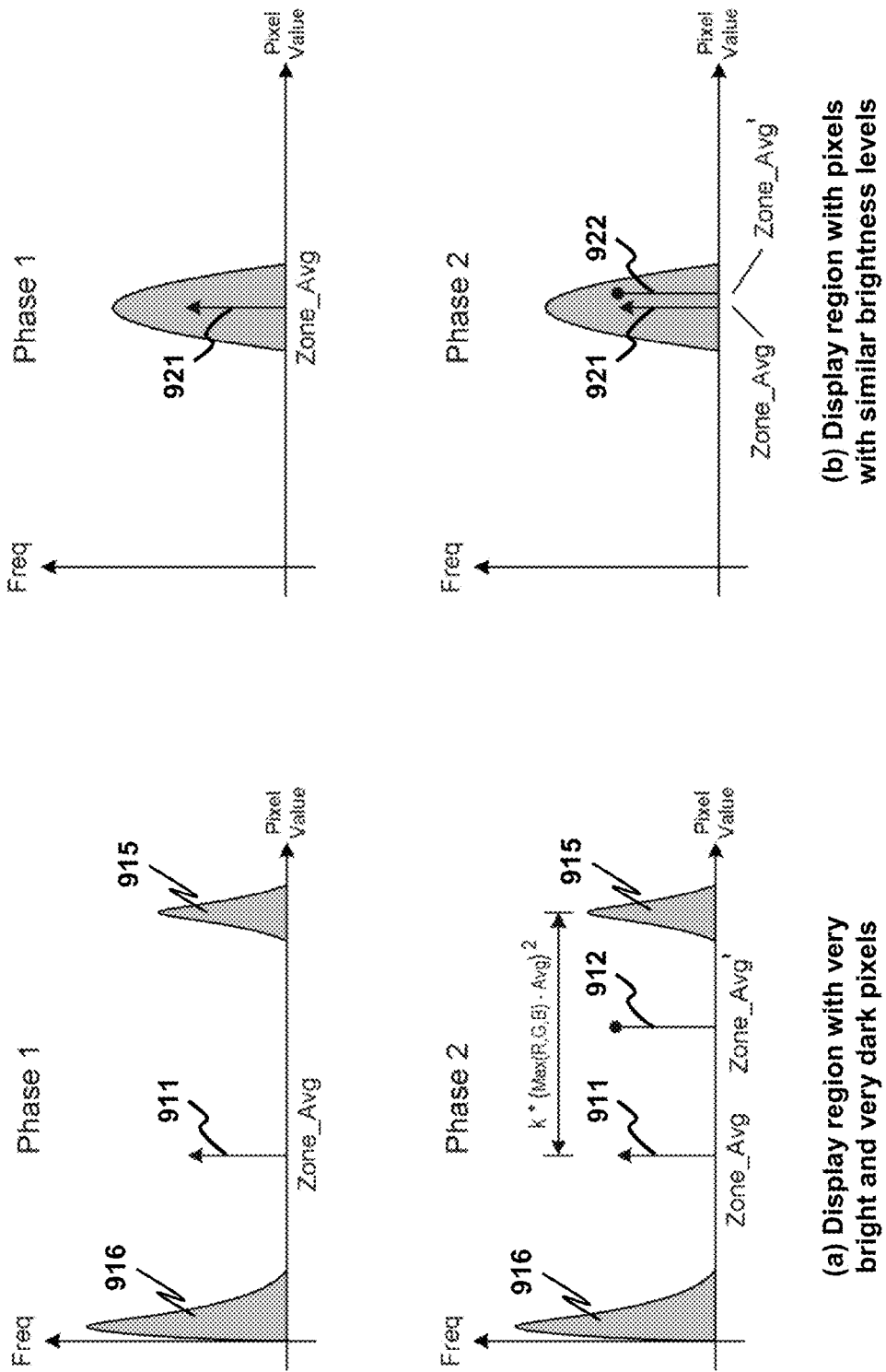
FIG. 9 demonstrates advantages offered by the two-phase arrangement in local dimming.

FIG. 9 demonstrates the advantage offered by the two-phase arrangement in the computation of dimming factor. In a first case (a) of FIG. 9, the image portion to be displayed on a display region under consideration has very bright and very dark pixels. The pixels are clustered into a bright-pixel group 915 and a dark-pixel group 916. The first average value 911 computed for the first case corresponds to a backlight luminance level located midway between brightness levels of the two groups 915, 916. Since the first average value 911 is far away from a typical brightness level of the bright-pixel group 915, if the first average value 911 is used as the backlight luminance level of the corresponding zone, brightness of the pixels of the bright-pixel group 915 is potentially insufficient when the pixels are displayed on the display region. Since the second average value 912 computed for the first case is inflated from the first average value 911, the second average value 912 is closer to the typical brightness level of the bright-pixel group 915 than the first average value 911. Using the second average value 912 as the backlight luminance level is much less likely to result in insufficient brightness for the bright-pixel group 915. In a second case (b) of FIG. 9, pixels of the image portion to be displayed on a display region under consideration have similar brightness levels. In the second case, the first average value 921 and the second average value 922 are close together, and are also close to the typical brightness level of the pixels. In considering both cases (a) and (b), using the second average value for local dimming brings an advantage in brightness to the case (a) without materially affecting the case (b).

By generalization of the above-disclosed two-phase arrangement in dimming-factor determination, the disclosed method for controlling the LC panel 120 and the backlight panel 110 to display the rectangular raw image 300 is developed as follows.

Figure 10:
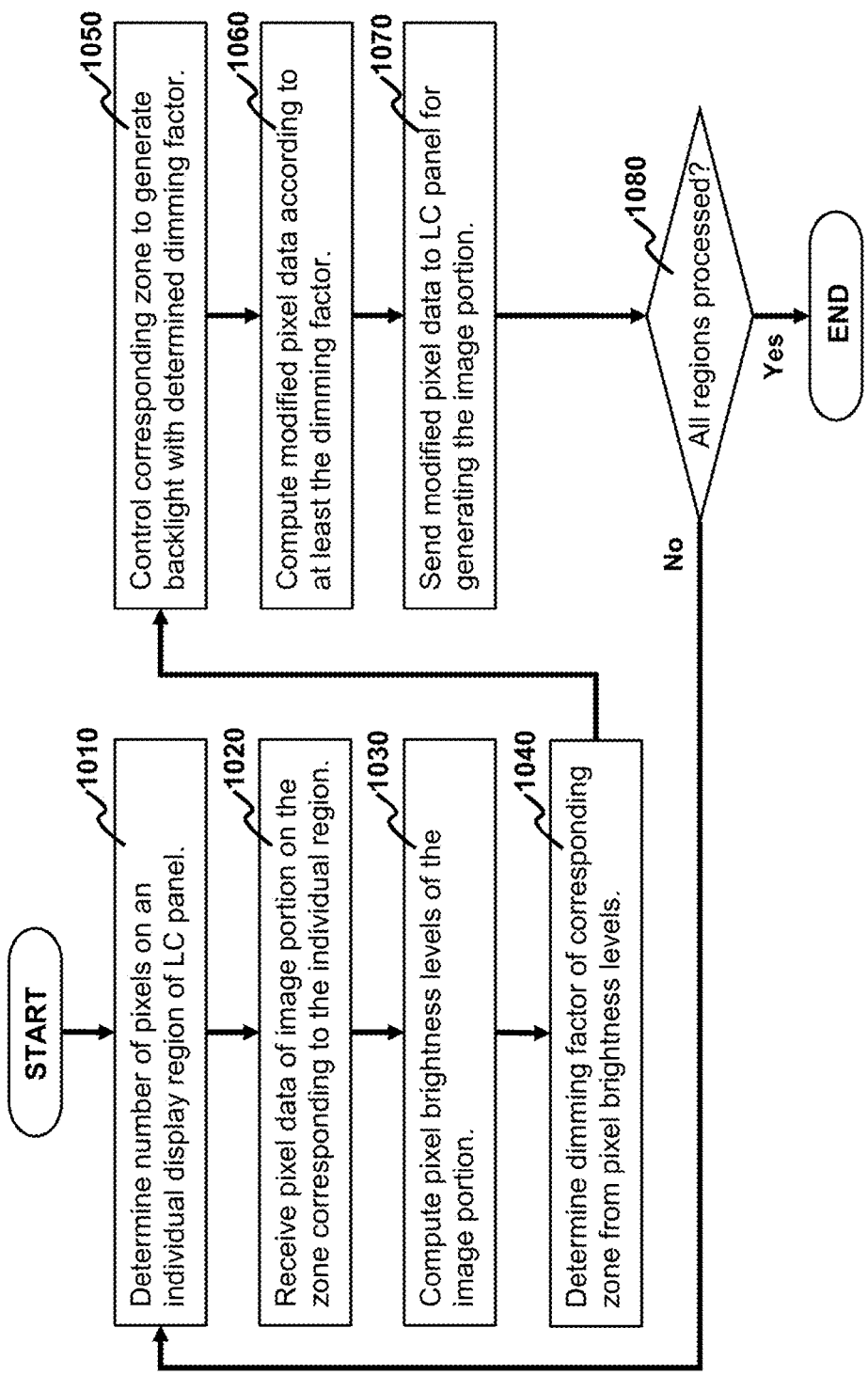
FIG. 10 depicts a flowchart showing the steps of an exemplary embodiment of a method for controlling the LC panel and the backlight panel to display an image.

The disclosed method is illustrated with the aid of FIG. 10, which depicts a flowchart showing the steps of an exemplary embodiment of the disclosed method. In the method, the LC panel 120 and the backlight panel 110 are controlled in a manner that a portion of the rectangular raw image 300 located on an individual display region of the display area 121 is displayed while controlling a zone corresponding to the individual display region to provide local dimming. In the forthcoming elaboration of the disclosed method, without loss of generality, consider controlling the LC panel 120 to display a portion of the visible image 185 on the display region 422 and controlling the zone 412 to generate backlight.

In a step 1010, a (total) number of pixels on the display region 422 is determined. The number of pixels is determinable according to the proportion of area of the zone 412 covered by the display region 422. For example, the number of pixels on the display region 422 is computed by multiplying a numeric value of the aforementioned proportion by a size of the zone 412 expressed in number of pixels. If the zone register 512 is directly used to store the number of pixels on the display region 422 as an equivalent to the aforementioned proportion, the number of pixels on the display region 422 is immediately available.

In a step 1020, a plurality of pixel data of an image portion located on the zone 412 is obtained, where the image portion is a portion of the rectangular raw image 300. Note that this plurality of pixel data is a part of the pixel data 180.

In a step 1030, a plurality of pixel brightness levels of the image portion is computed according to the plurality of pixel data. In the art, a pixel brightness level of an individual pixel is computable from a corresponding pixel data in a number of ways. If the visible image 185 is monochromatic, most often the pixel brightness level is directly given by the corresponding pixel data. If the visible image 185 is a color image, the corresponding pixel data consists of a plurality of subpixel data. Each subpixel data indicates a pixel brightness level of a color component of the individual pixel. Most often the plurality of subpixel data consists of a red-component intensity (R), a green-component intensity (G) and a blue-component intensity (B). In one embodiment, the pixel brightness level is computed as a maximum value in the plurality of subpixel data, i.e. max(R,G,B). In another embodiment, the pixel brightness level is given by (R+G+B)/3. In yet another embodiment, the pixel brightness level is computed as 0.299R+0.587G+0.114B, which takes into account the color sensitivity of human eyes. In an additional embodiment, the pixel brightness level is computed as 0.2126R+0.7152G+0.0722B, which is usually adopted in digital video systems. Those skilled in the art may use other formulas identified in the art for computing the pixel brightness level from the plurality of subpixel data.

After the plurality of pixel brightness levels is obtained in the step 1030, a dimming factor used in generating backlight of the zone 412 is determined in a step 1040. Particularly, the dimming factor is determined according to the plurality of pixel brightness levels and the number of pixels on the display region 422 in an absence of boundary information of the display area 121, thereby allowing local dimming to be provided without a need for such boundary information.

After the dimming factor is determined in the step 1040, the zone 412 of the backlight panel 110 is controlled to generate backlight with the determined dimming factor in a step 1050.

In a step 1060, a plurality of modified pixel data of the image portion is computed from the plurality of pixel data according to at least the dimming factor. Due to local dimming, the pixel data is required to be modified to compensate for a reduction in backlight luminance such that the same pixel brightness is maintained. Let Din be a pixel data, and DF be the dimming factor. In a first embodiment, the modified pixel data, Dout, is computed by Dout=Din/DF under a constraint that Dout is upper-bounded by a maximum allowable value of pixel data, e.g., 255. In a second embodiment, gamma correction is taken into consideration in computing Dout. In practical implementation, usually the LC panel 120 has a gamma value of around 1.8 to 2.2 between a pixel brightness level and an input pixel data. Let r be the gamma value. The modified pixel data is computed by $Dout=Din\times(1/DF)^{1/r}$ under the constraint that Dout is upper-bounded by the maximum allowable value of pixel data. In both the first and second embodiments, if the pixel data consists of a plurality of subpixel data, Din is a vector formed by the plurality of subpixel data in the calculation of Dout.

The plurality of modified pixel data is sent to the LC panel 120 for displaying the image portion on the display region 422 in a step 1070.

In a step 1080, the steps 1010, 1020, 1030, 1040, 1050, 1060 and 1070 are repeated for other sets of display region and corresponding zone until all display regions on the display area 121 are processed.

As one embodiment of the disclosed method for illustration, FIG. 10 depicts that the steps 1010, 1020, 1030, 1040, 1050, 1060 and 1070 are performed sequentially in a loop controlled by the step 1080. Despite this, those skilled in the art may rearrange some of the steps to obtain an equivalent realization of the disclosed method. For instance, the steps 1010, 1020 and 1030 may be individually performed in a batch for all display regions on the display area 121 independent of executing the steps 1040, 1050, 1060 and 1070. The step 1020 may also be accomplished by receiving the pixel data 180 for the entire raw image 300. The step 1040 may be performed for all zones on the light-emitting area 111 in a batch. The step 1080 may be modified to repeat the involved steps until all zones on the light-emitting area 111 are processed. Other rearrangements of the steps as deemed appropriate by those skilled in the art are possible.

Figure 11:
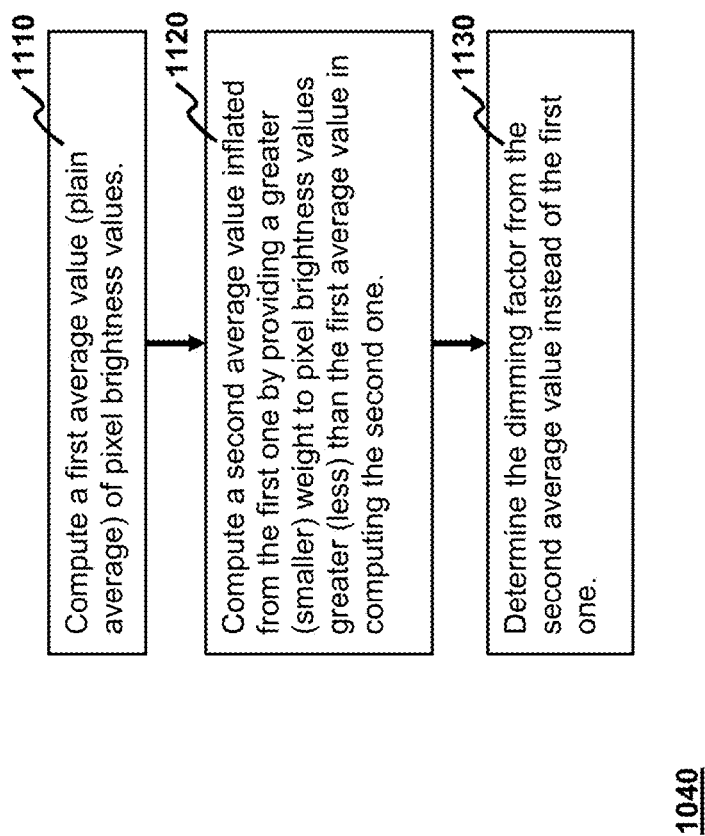
FIG. 11 depicts a flowchart showing exemplary steps used in the dimming-factor determination of the method of FIG. 10 in accordance with certain embodiments of the present disclosure.

Preferably, the determination of the dimming factor in the step 1040 adopts an approach according to the above-disclosed two-phase arrangement. FIG. 11 depicts a flowchart showing exemplary steps of the step 1040 in accordance with certain embodiments of the present disclosure.

In a step 1110, a first average value, $\bar{B}$, is computed by $\bar{B}=N^{-1}\Sigma_{i=1,\ldots,N}B_i$, where N is the number of pixels on the display region 422, and $\{B_i|i=1,\ldots,N\}$ is the plurality of pixel brightness levels. Equivalently, $\bar{B}$ may be computed by an alternative expression, which is $\bar{B}=N^{-1}\Sigma_{i=1,\ldots,M}B_i$ where M≥N is the number of pixels of a portion of the rectangular raw image 300 located on the zone 412, and $\{B_i|i=N+1,\ldots,M\}$ is a plurality of pixel brightness levels calculated from the aforementioned pixels located on both the zone 412 and the non-displayable area 310. Note that $B_i=0$, $i\in\{N+1,\ldots,M\}$. The alternative expression of B is usually preferable in practical implementation of the step 1110 in the apparatus 130.

After the first average value is obtained, in a step 1120, a second average value, $\bar{B}^r$, is computed by $\bar{B}^r=N^{-1}\Sigma_{i=1,\ldots,N}f(B_i)$, where $f(x)$ is a function satisfying that $f(x)=x$ for $x\leq\bar{B}$ and $f(x)>x$ for $x>\bar{B}$. It thereby causes a first pixel brightness level greater than the first average value to receive a greater weight in computing the second average value than a second pixel brightness level that is less than the first average value where the first and second pixel brightness levels are selected from the plurality of pixel brightness levels. Hence, the second average value is caused to be inflated from the first average value. Equivalently, $\bar{B}^r$ may be computed by $\bar{B}^r=N^{-1}\Sigma_{i=1,\ldots,M}f(B_i)$.

Preferably, $f(x)$ is an increasing function and is increasingly divergent as x increases from $\bar{B}$. As a result, it provides an increasingly greater weight to a third pixel brightness level in computing the second average value as the third pixel brightness level increases from the first average value where the third pixel brightness level is in the plurality of pixel brightness levels. One example of such $f(x)$ is $f(x)=\overline{B}+k\times(x-\overline{B})^2$ with $k>1$ as used in the above-disclosed two-phase arrangement.

After the second average value is obtained, in a step 1130, the dimming factor for the zone 411 is determined to be a lower one of a candidate dimming factor and 100%. The candidate dimming factor is a ratio of the second average value to the maximum brightness level deliverable by the backlight panel 110. Thereby, it achieves local dimming to save power in backlight generation while reducing a potential loss of image brightness in high-brightness part of the image portion.

Figure 12:
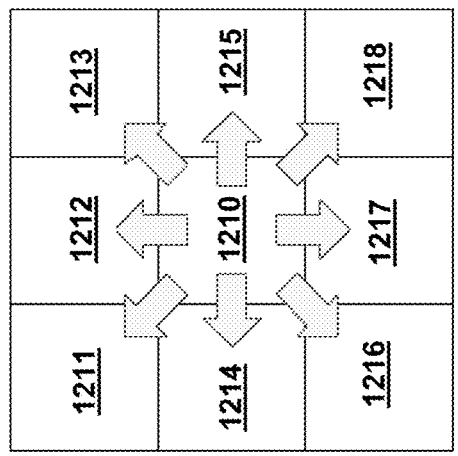
FIG. 12 depicts a light-leakage phenomenon of backlight produced by a zone and its impact to brightness of its neighboring zones.
Figure 12:
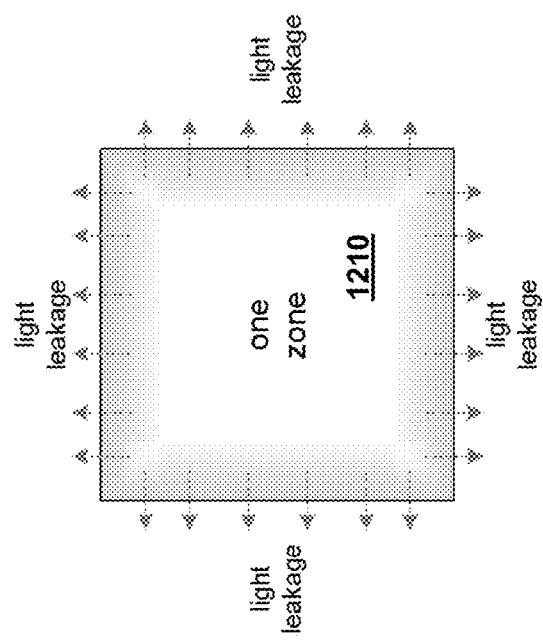

FIG. 12 depicts a light-leakage phenomenon of backlight produced by a zone 1210 and its impact to brightness of its neighboring zones 1211-1218. Since a light beam produced by a LED or mLED is usually not absolutely unidirectional but diverges to form a cone of light, there is light leakage from the zone 1210 to the neighboring zones 1211-1218. Consider an example situation that the dimming factor of the zone 1210 (e.g., 100%) is significantly greater than the dimming factor of all other neighboring zones 1211-1218 (e.g., at most 30%), implying that a bright zone is surrounded by eight dark zones. The boundary of the bright zone 1210 may look dimmer since there is no light dispersed from the dark zones 1211-1218 back to the bright zone 1210. To alleviate the leakage problem, nonlinear spatial filtering of dimming factors among the zones 1210-1218 may be used.

Figure 13:
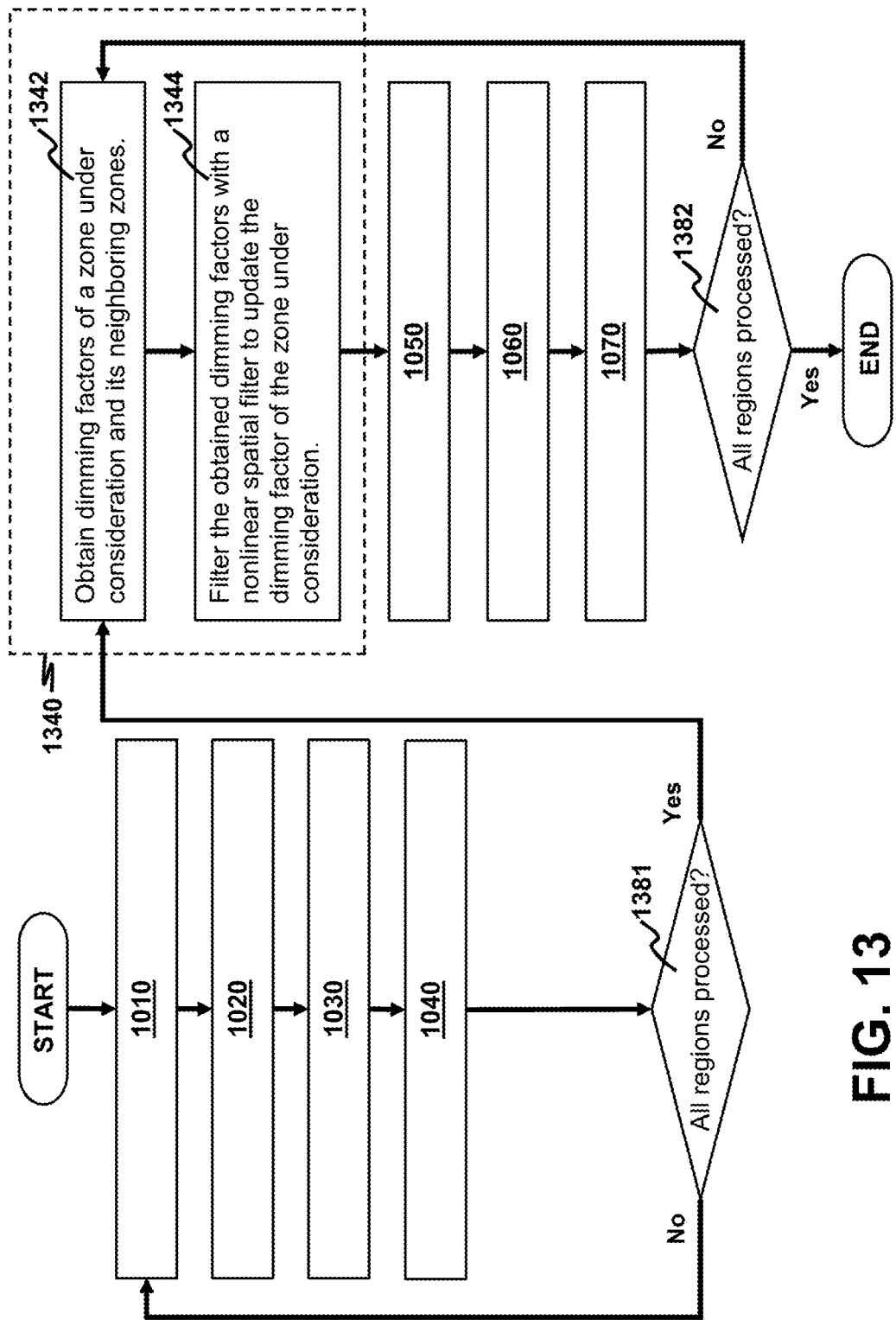
FIG. 13 depicts a flowchart showing the steps of an exemplary embodiment of the disclosed method that includes nonlinear spatial filtering of determined dimming factors.

FIG. 13 depicts a flowchart showing the steps of an exemplary embodiment of the disclosed method that includes nonlinear spatial filtering of the determined dimming factors. In FIG. 13, the steps 1010, 1020, 1030, 1040, 1050, 1060 and 1070 are detailed above. In a step 1381, the steps 1010, 1020, 1030 and 1040 are repeated for different sets of display region and corresponding zone until all display regions on the display area 121 are processed. A first loop formed by the steps 1010, 1020, 1030, 1040 and 1381 is used to compute dimming factors for all the zones on the light-emitting area 111. After the dimming factors for all the zones are obtained, a second loop formed by steps 1342, 1344, 1050, 1060, 1070 and 1382 is executed, where in the step 1382, the steps 1342, 1344, 1050, 1060 and 1070 are repeated for different sets of display region and corresponding zone until all display regions on the display area 121 are processed. The second loop is used to update the dimming factors by nonlinear spatial filtering, to use the updated dimming factors to control the zones in backlight generation, and to control the LC panel 120 to generate the visible image 185. In particular, before the step 1050 of controlling a zone under consideration, say, the zone 1210, to generate backlight is executed, the dimming factor for the zone 1210 is updated by an updating process 1340. The updating process 1340 includes the steps 1342 and 1344.

In the step 1342, respective dimming factors determined for neighboring zones immediately adjacent to the zone 1210, i.e. the neighboring zones 1211-1218, are obtained. The dimming factors of the zone 1210 and of the neighboring zones 1211-1218 collectively form a plurality of dimming factors obtained by a cluster consisting of the zone 1210 and the neighboring zones 1211-1218. The dimming factors of the neighboring zones 1211-1218 alone forms a plurality of neighboring-zone dimming factors.

In the step 1344, the plurality of dimming factors obtained by the cluster is filtered with a nonlinear spatial filter to update the dimming factor of the zone 1210. The nonlinear spatial filter is configured to reduce luminance non-uniformity occurred over the zone 1210 and caused by light leakage to and from the neighboring zones 1211-1218. In one embodiment, the nonlinear spatial filter is configured as follows. Identify a maximum value in the plurality of neighboring-zone dimming factors. If the dimming factor of the zone 1210 is not less than a threshold value equal to a predetermined percentage of the identified maximum value, then the dimming factor of the zone 1210 is kept unchanged. Otherwise, the dimming factor of the zone 1210 is updated to be the threshold value so as to reduce the luminance non-uniformity occurred over the zone 1210 and caused by light leakage to and from the neighboring zones 1211-1218. In one embodiment, the predetermined percentage is in a range of 60% to 70%.

Other implementation details of the present disclosure are elaborated as follows.

In one embodiment, an individual zone of the backlight panel 110 is formed with a LED. The LED is controllable by the apparatus 130 to generate backlight with the dimming factor determined for the individual zone.

In another embodiment, the individual zone is formed with a plurality of mLEDs distributed over the individual zone. The plurality of mLEDs is controllable by the apparatus 130 to collectively generate backlight with the dimming factor determined for the individual zone.

The plurality of zone registers 132 may be implemented as a random access memory, a read-only memory, a flash memory, or other memory deemed appropriate by those skilled in the art.

For the one or more computing units 135, an individual computing unit may be realized as an IC or as a module comprising plural electronic circuits. The individual computing unit may be an electronic circuit realizing a computing processor core. The computing processor core has computing capability and input/output capability so as to enable controlling the backlight panel 110 and the LC panel 120. If the apparatus 130 is realized as a single IC, implementing the individual computing unit with a computing processor core is a general approach. Alternatively, the individual computing unit may be a standalone computing processor, which may be a general-purpose processor, an application-specific integrated circuit, a special-purpose processor such as a digital signal processor, a microcontroller, a programmable logic device such as a field programmable gate array, and other programmable circuits or devices as deemed suitable by those skilled in the art.

Figure 14A:
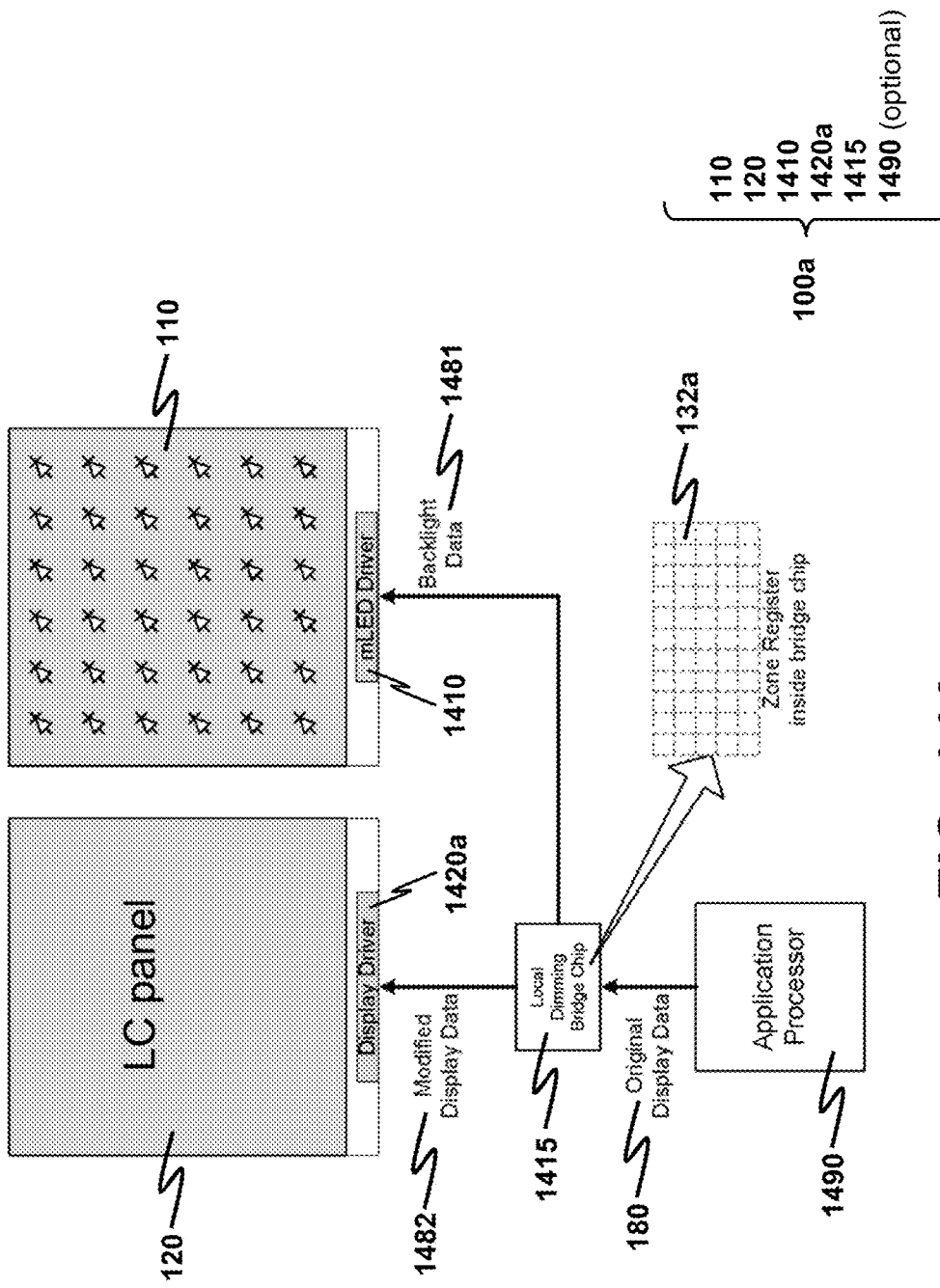
FIG. 14A depicts a first practical realization of the LCD where the disclosed apparatus is realized as a local dimming bridge chip.
Figure 14B:
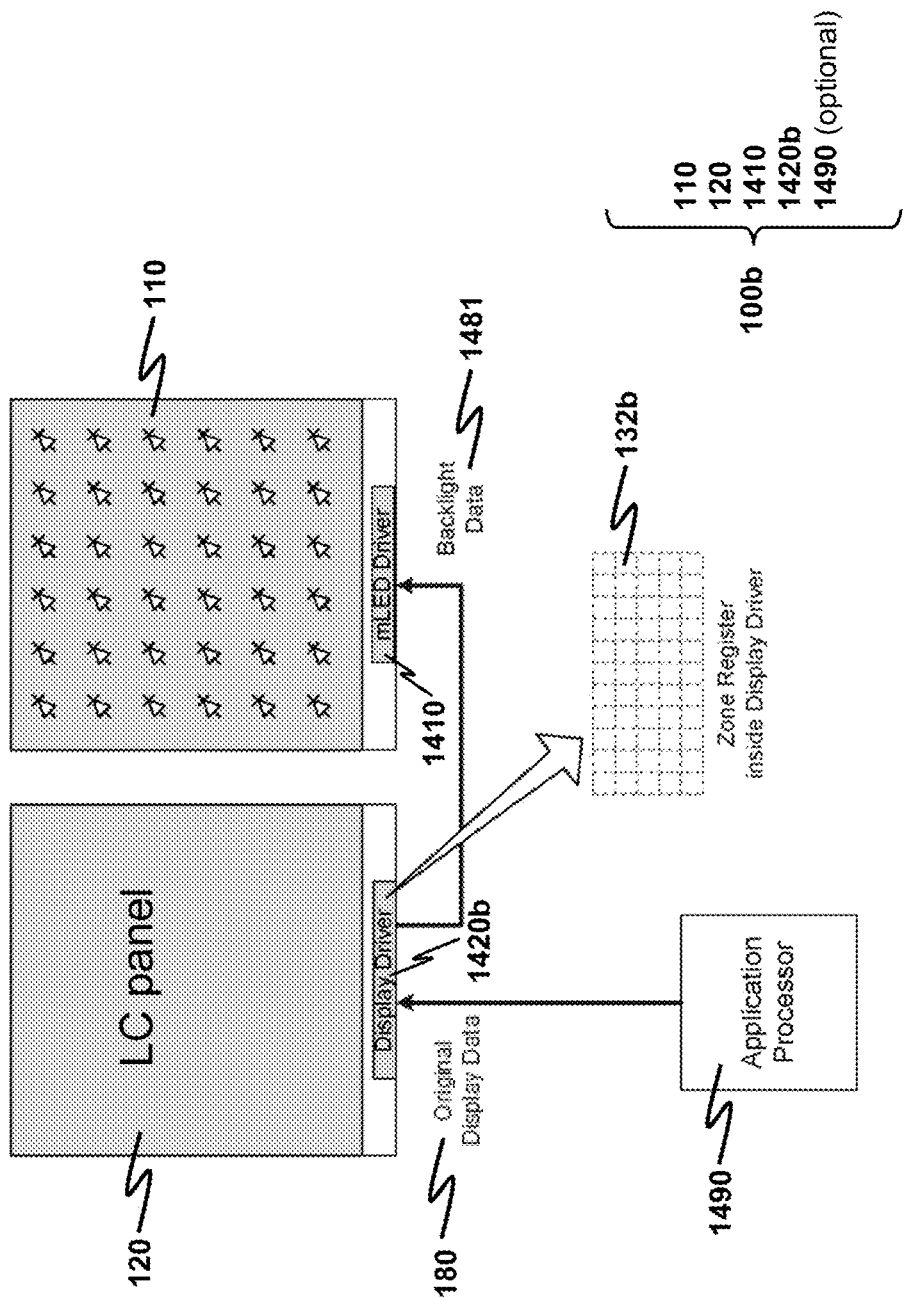
FIG. 14B depicts a second practical realization of the LCD where the disclosed apparatus is realized a display driver.

FIGS. 14A and 14B depicts two practical realizations of the disclosed LCD 100.

A first LCD 100a as depicted in FIG. 14A comprises the LC panel 120, the backlight panel 110, a display driver 1420a, a mLED driver 1410 and a local dimming bridge chip 1415. The LC panel 120 and the backlight panel 110 are driven by the display driver 1420a and the mLED driver 1410, respectively. The display driver 1420a and the mLED driver 1410 are interfaced with a local dimming bridge chip 1415. The local dimming bridge chip 1415, being an IC, is realized as the disclosed apparatus for controlling the LC panel 120 and the backlight panel 110 to provide local dimming and to display the rectangular raw image 300. Hence, a plurality of zone registers 132a is installed in the local dimming bridge chip 1415. The local dimming bridge chip 1415 receives the pixel data 180 from an application processor 1490. Depending on practical situations, the application processor 1490 may be included in the first LCD 100a or may be considered an external device to the first LCD 100a. The local dimming bridge chip 1415 computes backlight data 1481 (i.e. dimming factors or control data equivalent thereto) and modified display data 1482 from the received pixel data 180. The local dimming bridge chip 1415 controls the LC panel 120 and the backlight panel 110 through sending the modified display data 1482 to the display driver 1420a, and sending the backlight data 1481 to the mLED driver 1410, respectively.

A second LCD 100b as depicted in FIG. 14B comprises the LC panel 120, the backlight panel 110, a display driver 1420b and the mLED driver 1410. The LC panel 120 and the backlight panel 110 are driven by the display driver 1420b and the mLED driver 1410, respectively. The display driver 1420b is realized as the disclosed apparatus for controlling the LC panel 120 and the backlight panel 110 to provide local dimming and to display the rectangular raw image 300. Hence, a plurality of zone registers 132b is installed in the display driver 1420b. Furthermore, the display driver 1420b further includes an internal circuitry for electrically driving the LC panel 120 to display an image. The display driver 1420b receives the pixel data 180 from the application processor 1490. Similar to the first LCD 100a, the application processor 1490 may be included in the second LCD 100b or may be considered an external device to the second LCD 100b. The display driver 1420b computes the backlight data 1481 and the modified display data 1482 (not shown in FIG. 14B) from the received pixel data 180. The display driver 1420b sends the backlight data 1481 to the mLED driver 1410 for realizing local dimming at the backlight panel 110. The modified display data 1482 are used by the internal circuitry of the display driver 1420b to drive the LC panel 120 for displaying the visible image 185.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus for controlling a liquid crystal (LC) panel and a backlight panel to display a rectangular raw image, the backlight panel being used for illuminating the LC panel, the LC panel having a display area arbitrary in shape, a light-emitting area of the backlight panel being partitioned into a plurality of zones individually controllable for providing local dimming to the LC panel, the plurality of zones defining a grid used for partitioning the display area into a plurality of display regions such that an individual display region is illuminated by a corresponding zone of the backlight panel, the apparatus comprising:
  a plurality of zone registers for the plurality of zones, a respective zone register for the corresponding zone being used to record a proportion of area of the corresponding zone covered by the individual display region; and
  one or more computing units communicable with the plurality of zone registers, the one or more computing units being configured to control the corresponding zone to generate backlight with a dimming factor determined according to plural pixel data of a portion of the image located on the corresponding zone and according to the proportion of area of the corresponding zone covered by the individual display region, allowing local dimming to be provided without a need for boundary information of the display area.

2. The apparatus of claim 1, wherein the one or more computing units are further configured to execute a process comprising the steps of:
  determining a number of pixels on the individual display region according to the proportion of area of the corresponding zone covered by the individual display region;
  receiving a plurality of pixel data of the image portion;
  computing a plurality of pixel brightness levels of the image portion according to the plurality of pixel data;
  determining the dimming factor according to the plurality of pixel brightness levels and the number of pixels on the individual display region;
  controlling the corresponding zone to generate backlight with the dimming factor;
  computing a plurality of modified pixel data of the image portion from the plurality of pixel data according to at least the dimming factor; and
  sending the plurality of modified pixel data to the LC panel for displaying the image portion on the individual display region.

3. The apparatus of claim 2, wherein the determination of the dimming factor comprises the steps of:
  computing a first average value, $\overline{B}$, by $\overline{B}=N^{-1}\Sigma_{i=1,\ldots,N}B_i$, where N is the number of pixels on the individual display region, and $\{B_i|i=1,\ldots,N\}$ is the plurality of pixel brightness levels;
  computing a second average value, $\overline{B}^\dagger$, by $\overline{B}^\dagger=N^{-1}\Sigma_{i=1,\ldots,N}f(B_i)$, where $f(x)$ is a function satisfying that $f(x)=x$ for $x\leq\overline{B}$ and $f(x)>x$ for $x>\overline{B}$, thereby causing a first pixel brightness level greater than the first average value to receive a greater weight in computing the second average value than a second pixel brightness level that is less than the first average value where the first and second pixel brightness levels are in the plurality of pixel brightness levels, and hence causing the second average value to be inflated from the first average value; and
  determining the dimming factor to be a lower one of a candidate dimming factor and 100%, the candidate dimming factor being a ratio of the second average value to a predetermined maximum brightness level deliverable by the backlight panel, thereby achieving local dimming to save power in backlight generation while reducing a potential loss of image brightness in high-brightness part of the image portion.

4. The apparatus of claim 3, wherein $f(x)$ is an increasing function and is increasingly divergent as x increases from $\overline{B}$, thereby providing an increasingly greater weight to a third pixel brightness level in computing the second average value as the third pixel brightness level increases from the first average value where the third pixel brightness level is in the plurality of pixel brightness levels.

5. The apparatus of claim 2, wherein before controlling the corresponding zone to generate backlight, updating the dimming factor by an updating process comprising the steps of:
  obtaining respective dimming factors determined for neighboring zones immediately adjacent to the corresponding zone, said respective dimming factors forming a plurality of neighboring-zone dimming factors; and
  if the dimming factor is not less than a threshold value equal to a predetermined percentage of a maximum value in the plurality of neighboring-zone dimming factors, then keeping the dimming factor unchanged, else updating the dimming factor to be the threshold value so as to reduce luminance non-uniformity occurred over the corresponding zone and caused by light leakage to and from the neighboring zones.

6. The apparatus of claim 5, wherein the predetermined percentage is in a range of 60% to 70%.

7. The apparatus of claim 2, wherein before controlling the corresponding zone to generate backlight, updating the dimming factor by an updating process comprising the steps of:
obtaining respective dimming factors determined for neighboring zones immediately adjacent to the corresponding zone, the dimming factor and said respective dimming factors collectively forming a plurality of dimming factors obtained by a cluster consisting of the corresponding zone and the neighboring zones; and
filtering the plurality of dimming factors obtained by the cluster with a nonlinear spatial filter to update the dimming factor, wherein the nonlinear spatial filter is configured to reduce luminance non-uniformity occurred over the corresponding zone and caused by light leakage to and from the neighboring zones.

8. The apparatus of claim 2, wherein the plurality of modified pixel data is computed from the plurality of pixel data according to the determined dimming factor and a gamma value of the LC panel.

9. The apparatus of claim 2, wherein:
in the plurality of pixel data, an individual pixel data associated with a corresponding pixel of the image portion consists of a plurality of subpixel data, each subpixel data indicating a pixel brightness level of a color component in forming the image portion at the corresponding pixel; and
in computing the plurality of pixel brightness levels of the image portion, a pixel brightness level of the image portion displayed at the corresponding pixel is computed as a maximum value in the plurality of subpixel data.

10. A liquid crystal display (LCD) comprising:
a liquid crystal (LC) panel and a backlight panel, the backlight panel being used for illuminating the LC panel, the LC panel having a display area arbitrary in shape, a light-emitting area of the backlight panel being partitioned into a plurality of zones individually controllable for providing local dimming to the LC panel, the plurality of zones defining a grid used for partitioning the display area into a plurality of display regions such that an individual display region is illuminated by a corresponding zone of the backlight panel; and
the apparatus for controlling the LC panel and the backlight panel to display a rectangular raw image as set forth in claim 1.

11. The LCD of claim 10, wherein the corresponding zone is formed with a plurality of mini light emitting diodes (mLEDs) distributed over the corresponding zone, the plurality of mLEDs being controllable by the apparatus to collectively generate backlight with the dimming factor.

12. A method for controlling a liquid crystal (LC) panel and a backlight panel to display a rectangular raw image, the backlight panel being used for illuminating the LC panel, the LC panel having a display area arbitrary in shape, a light-emitting area of the backlight panel being partitioned into a plurality of zones individually controllable for providing local dimming to the LC panel, the plurality of zones defining a grid used for partitioning the display area into a plurality of display regions such that an individual display region is illuminated by a corresponding zone of the backlight panel, the method comprising the steps of:
determining a number of pixels on the individual display region;
receiving a plurality of pixel data of a portion of the image located on the corresponding zone;
computing a plurality of pixel brightness levels of the image portion according to the plurality of pixel data;
determining a dimming factor used in generating backlight for the corresponding zone according to the plurality of pixel brightness levels and the number of pixels on the individual display region in an absence of boundary information of the display area, thereby allowing local dimming to be provided without a need for such boundary information;
controlling the corresponding zone to generate backlight with the dimming factor;
computing a plurality of modified pixel data of the image portion from the plurality of pixel data according to at least the dimming factor; and
sending the plurality of modified pixel data to the LC panel for displaying the image portion on the individual display region.

13. The method of claim 12, wherein the determination of the dimming factor comprises the steps of:
computing a first average value, $\overline{B}$, by $\overline{B}=N^{-1}\Sigma_{i=1,\ldots,N} B_i$, where N is the number of pixels on the individual display region, and $\{B_i|i=1,\ldots,N\}$ is the plurality of pixel brightness levels;
computing a second average value, $\overline{B^r}$, by $\overline{B^r}=N^{-1}\Sigma_{i=1,\ldots,N} f(B_i)$, where $f(x)$ is a function satisfying that $f(x)=x$ for $x\leq\overline{B}$ and $f(x)>x$ for $x>\overline{B}$, thereby causing a first pixel brightness level greater than the first average value to receive a greater weight in computing the second average value than a second pixel brightness level that is less than the first average value where the first and second pixel brightness levels are in the plurality of pixel brightness levels, and hence causing the second average value to be inflated from the first average value; and
determining the dimming factor to be a lower one of a candidate dimming factor and 100%, the candidate dimming factor being a ratio of the second average value to a predetermined maximum brightness level deliverable by the backlight panel, thereby achieving local dimming to save power in backlight generation while reducing a potential loss of image brightness in high-brightness part of the image portion.

14. The method of claim 13, wherein $f(x)$ is an increasing function and is increasingly divergent as x increases from $\overline{B}$, thereby providing an increasingly greater weight to a third pixel brightness level in computing the second average value as the third pixel brightness level increases from the first average value where the third pixel brightness level is in the plurality of pixel brightness levels.

15. The method of claim 12, wherein before controlling the corresponding zone to generate backlight, updating the dimming factor by an updating process comprising the steps of:
obtaining respective dimming factors determined for neighboring zones immediately adjacent to the corresponding zone, said respective dimming factors forming a plurality of neighboring-zone dimming factors; and
if the dimming factor is not less than a threshold value equal to a predetermined percentage of a maximum value in the plurality of neighboring-zone dimming factors, then keeping the dimming factor unchanged, else updating the dimming factor to be the threshold value so as to reduce luminance non-uniformity occurred over the corresponding zone and caused by light leakage to and from the neighboring zones.

16. The method of claim 15, wherein the predetermined percentage is in a range of 60% to 70%.

17. The method of claim 12, wherein before controlling the corresponding zone to generate backlight, updating the dimming factor by an updating process comprising the steps of:

obtaining respective dimming factors determined for neighboring zones immediately adjacent to the corresponding zone, the dimming factor and said respective dimming factors collectively forming a plurality of dimming factors obtained by a cluster consisting of the corresponding zone and the neighboring zones; and filtering the plurality of dimming factors obtained by the cluster with a nonlinear spatial filter to update the dimming factor, wherein the nonlinear spatial filter is configured to reduce luminance non-uniformity occurred over the corresponding zone and caused by light leakage to and from the neighboring zones.

18. The method of claim 12, wherein the plurality of modified pixel data is computed from the plurality of pixel data according to the determined dimming factor and a gamma value of the LC panel.

19. The method of claim 12, wherein:

in the plurality of pixel data, an individual pixel data associated with a corresponding pixel of the image portion consists of a plurality of subpixel data, each subpixel data indicating a pixel brightness level of a color component in forming the image portion at the corresponding pixel; and in computing the plurality of pixel brightness levels of the image portion, a pixel brightness level of the image portion displayed at the corresponding pixel is computed as a maximum value in the plurality of subpixel data.

* * * * *